United States Patent Office 3,390,779
Patented July 2, 1968

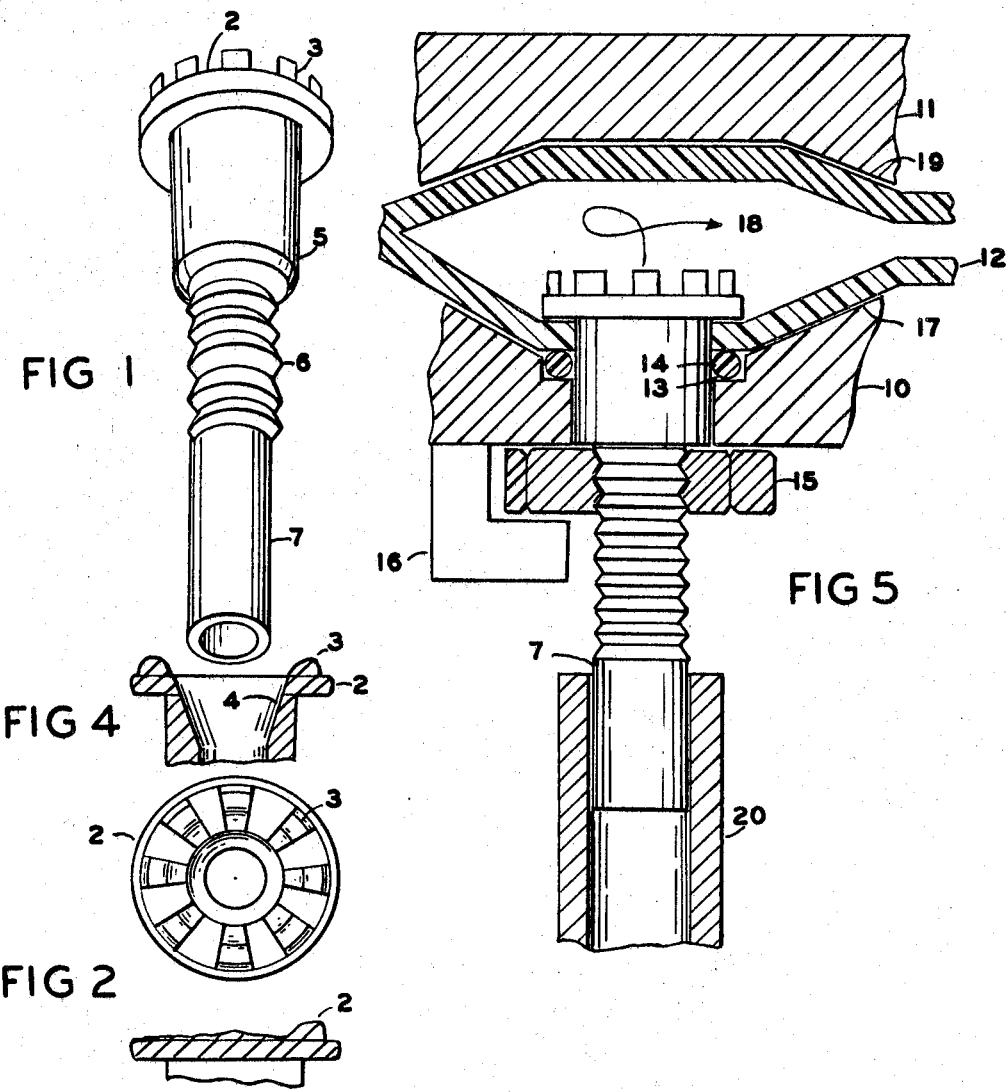

3,390,779
INLET-OUTLET TUBE DEVICE FOR
HEMODIALYSIS
Herman L. Kumme, 2312 Walnut Lane, Arden, Del.,
and John F. Lontz, 515 Eskridge Drive, Wilmington,
Del. 19809
Filed Nov. 16, 1964, Ser. No. 411,200
1 Claim. (Cl. 210—321)

ABSTRACT OF THE DISCLOSURE

An interchangeable inlet and outlet device having a circular cross-section expanding conically to an enlarged rim having multiple deflectors that direct the flow radially and capable of serving in reverse manner for the confluency of the flow into the conical taper and emerging to the same circular cross-section, and means to seal said device to a thin membrane.

This invention pertains to a novel inlet and outlet device for use in coursing a fluid such as blood in between dialyzing membranes. This application relates to co-pending applicatons, Ser. No. 411,206, filed Nov. 16, 1964, and Ser. No. 411,407, filed Nov. 16, 1964, now abandoned, which describe a dialyzer of the parallel plate type having several novel features and functions relating to an efficient artificial kidney.

The present invention provides an improved, reliable inlet and outlet tubing as a device for converting a circular cross-sectional flow of blood into a filmed out flow with a high surface-to-volume ratio and interposed between dialyzing membranes which are confined by a continuous etxerior gasketing. This device provides for deflecting lugs or vanes that distribute the entering fluid, such as blood, radially to a substantially filmed out rectangular area and then returned in reverse manner at an exit end of the dialyzer such as is described in our co-pending applications.

Heretofore parallel plate dialyzers usually depended upon end-wise inlet and outlets into the confining membranes, often interrupting the continuity of rubbery or elastomeric gaskets, or placed through ports with no provision for deflecting the fluid into far reaches of the plate. The former invariably leads to unaligned or unmatched continuity between the gasket and the inlet-outlet ports thus causing frequent and annoying leakage. In the course of hemodialysis with patients or animals this is highly undesirable as chance bacterial contamination can get into the leak, especially if it is slow and partially stagnant, and migrate into the blood stream that may prove serious or disastrous to the patient or animal. Even in stacked-up plates where ports are aligned and then held closed under clamping pressure, a slight misalignment will cause seepage of dialysis solution into blood. This too is equally dangerous as the aseptic blood soon becomes contaminated by the bacteria growing in the dialysis solution which is not sterile to begin with. Hence a serious problem exists with parallel plate dialyzers that do not have an eflective seal between the inlet-outlet ports and the flowing blood interposed between the membranes as shown in our co-pending applications. These two shortcomings, namely potential leakage and invasion by bacteria and inadequate deflection of the blood to the square or near-square corners of parallel plate dialyzers, have been solved simultaneously by a novel design of the plates and the inlet-outlet device of this invention.

An object of this invention is therefore to provide a blood inlet and outlet port that can be sealed positively against the membrane and not interfere with the confining gasket line. Another object is to provide an efficient configuration that will deflect the flowing blood in full radial direction and thus minimize or eliminate any stagnation of the coursing blood. Still another object of this invention is to provide an interchangeable configuration of the ports so that they can be used either as inlet or outlet. These and other objects will become apparent as the descriptive details are studied.

These objects are accomplished by providing an integral device that is sealed with its own O-ring, made secure to the dialyzer with a threaded structure secured to a nut, and has a deflecting spreader top shaped to cause the blood to course radially as it moves from the circular cross-sectional flow, made of a durable, stiff material a molded or machined plastic.

FIGURE 1 is a projected view of the complete integrated interchangeable inlet-outlet tube.

FIGURE 2 is a top or elevated view of the tube.

FIGURE 3 is a sectional view of the top deflecting with one lug in view.

FIGURE 4 is a view of the internal bore change from a circular cross-section to an expanded deflecting opening.

FIGURE 5 is a sectional view of the interchangeable inlet-outlet tube fixed in position with the cellophane membranes and the top and bottom hollow enclosure plates.

Referring to FIGURE 1, the principal features of this invention comprise an integrated, sealing interchangeable inlet and outlet flow tube having radial deflecting head 2 that serves to spread out the flow of blood with individual deflecting vanes 3 that serve to prevent the membranes from collapsing, especially as the suction develops during the dialysis and thus close off the flow, and are contoured to remove all sharp edges. FIGURE 2 illustrates a typical 8-membered deflecting head so spaced that the cellophane can not collapse even at a gauge vacuum as high as 700 millimeters of mercury, while FIGURE 3 illustrates the streamlined edges. A taper 4 of from 30 to 90 degrees is provided inside of the tube to assure no constriction. Since the inlet and outlet tubes must traverse through the thickness of the bottom dialysis plate shown in our above-mentioned co-pending applications, a shank length 5 is provided to clear the bottom plate 10 shown in FIGURE 5 in this co-pending application and secured by a threaded length 6 and continued to a short length, all made of one single material preferably plastic such as "Delrin" acetal, "Lucite" acrylic, "Hexan" polycarbonate and similar rigid resins; of these "Delrin" is preferred because of its ability to withstand autoclaving and its derivation from polymerized formaldehyde.

When assembled into the dialysis plate, the sealing inlet-outlet tube 1 is arranged as shown in FIGURE 5. The tube is entered through a pre-cut, circular hole of the membrane 12 and seated in a circular groove 13 holding an O-ring 14. The tube 1 is then closed to the membrane by hexagonal screw 15 made secure against loss by retainer lug 16 affixed to the bottom plate 10. Thus the shoulder of the inlet-outlet tube presses down the membrane against the O-ring and hence makes a perfect seal against leakage from compressive cut of the film by over-pressuring thus imparting a second novel feature, the first being the aforementioned prevention of restriction of the blood flow by collapse of the membrane under high suction or vacuum. The entire closed arrangement is seated in a tapered cavity 17 with a low angle of taper and sufficiently deep to allow a generous clearance of the deflecting vanes 2 to obviate any obstruction to the flow of blood and to minimize excess fluid turbulence 18 or shear. Superimposed conversely over cavity 17 is an upper replicate cavity 19 with matching low angle of taper to which the membrane can conform by stretching within the yield limits. A flexible tubing 20 of either rubber, plasticized polyvinyl chloride (known commercially as "Tygon"), polymethylsiloxane or any other equivalent material through which the blood is made to pass into or out of the dialyzing plate is then affixed to the inlet and outlet tubing to complete the extracorporeal circulation from the patient shunt.

In assembling of the dialyzer described in our above mentioned co-pending applications, a pair of the inlet-outlet devices are appropriately sterilized prior to the actual assembling with the semipermeable dialyzing membranes. The bottom membrane is first laid out on the bottom plate stretched or drawn out smoothly over the confining gasket line. A hole is then punched in the membrane just over the ports of the bottom plate in any one of several forms such as complete circular hole or radial slits using a surgical blade. The inlet and outlet devices are inserted through the membrane holes and through the plate ports and then secured by applying a tightening or turning action on the nut 15 at each of these two ports, thereby drawing down the cellophane snugly over the O-ring 14 at each port. Next, the top semipermeable membrane is placed over the bottom one making sure again that this second membrane likewise stretches or draws beyond the confining gasket line. The top hollow enclosure plate is then placed over the membranes so that the securing holes for the clamping screws are in register by the two hollow plates. The screws then secure the dialyzer to a leakproof assembly. The necessary blood inlet tubing from the patient shunt and the blood outlet tubing to the debubbler is then applied with a snug fit using tubing of appropriate diameters. The dialyzer plate is then filled appropriately with sterilizing or priming fluid in the interposed middle blood compartment and with water or dialyzing solution in the upper and lower compartments to check on tightness of the inlet-outlet devices. In disassembling the plate following a completed dialysis, the reverse procedure is applied. The membranes are discarded and the inlet-outlet tube cleansed thoroughly, chemically disinfected and autoclaved in preparation for the next assembly.

Several modifications of the inlet-outlet flow tube with its numerous component features can be applied as needed to accommodate for instance the depth or thickness of the ports in the bottom plate thereby requiring a lengthening or shortening of the shank 5. This is usually set at ½ inch O.D. and can be made larger or smaller, again depending upon the port dimensions. These dimensional modifications apply equally to the other geometric features. Of particular importance is the configuration of the raised slots 3 which can be further modified to improve the effectiveness in spreading the incoming blood from a round or circular cross-sectional area to a flattened film with intervening changes in direction. Although FIGURE 2 showing the 8-membered raised lugs in a symmetrical radial array which has proven clinically adequate with no detectable resistance to flow, other configurations for spreading out the blood from a circular to a filmed flow can be used. One modification consisted in making twelve radial lugs instead of eight. Another modification involved slanting the height of the lugs so as to impel the coursing blood preferentially to the sides of the plate. From the standpoint of construction, almost any rigid plastic or metallic material can be used so long as it causes no deleterious effect of the blood. It is preferred to use acetal resins, known commercially as "Delrin" or "Celcon," because of ease of machining and molding and practically no discoloration on continuous and repeated exposure to blood. Nylon and acrylic resin has been used quite satisfactorily as these have good stiffness modulus. Polytetrafluoroethylene has also proven satisfactory as a material of construction for the inlet-outlet tube. While the configuration shown in FIGURE 1 is of a single material, suitable substitute with two or more component parts fitted together with friction fit or with threading can be used as well.

The device of this invention consists of a novel means for introducing a fluid such as blood in between two parallel layers of a semipermeable membrane with provisions for radially deflecting the flow of the blood from a circular cross-section to a rapidly spread-out filmed layer. Conversely, as the blood courses through the dialyzer toward an outlet the same configuration is used in reverse to gather the blood from a filmed out state to a circular cross-section for return to the originating source. This arrangement insures the confinement of the coursing blood within a gasketed area that is not broken by inlet and outlet devices used in other similar dialysis but with much disruption of flow and with undesirable leakage.

What is claimed:

1. In a hemodialysis device of the type passing blood, an inlet device for a thin membrane envelope made of rigid structure material for directing the flow of fluids said device having a circular cross-section, expanded conically to an enlarged circular rim, a plurality of deflectors mounted on said rim for directing the flow radially, said inlet being provided with a head that is made to be compressed against a circular seal of said envelope, said deflectors being of sufficient height to prevent said envelope from collapsing.

References Cited

UNITED STATES PATENTS

| | | | |
|---|---|---|---|
| 794,840 | 7/1905 | Barker | 210—456 X |
| 865,691 | 9/1907 | Fox | 210—456 X |
| 1,749,730 | 3/1930 | Kenney | 210—456 X |
| 2,323,160 | 6/1943 | Stecher et al. | 210—232 X |
| 2,686,154 | 8/1954 | MacNeill | 210—321 |
| 3,051,316 | 8/1962 | MacNeill | 210—456 X |
| 3,077,268 | 2/1963 | Gobel et al. | 210—456 X |

FOREIGN PATENTS 549,912  10/1956  Italy.

SAMIH N. ZAHARNA, *Primary Examiner.*

REUBEN FRIEDMAN, *Examiner.*

F. SPEAR, *Assistant Examiner.*